United States Patent [19]

Leps et al.

[11] Patent Number: 5,113,619
[45] Date of Patent: May 19, 1992

[54] METHOD OF ADHERING BACTERIA TO SEED AND COMPOSITION THEREFOR

[76] Inventors: Walter T. Leps, 3943 - 55 Street, T6L 1C1 Edmonton, Alberta, Canada; Bradley G. Thompson, 39 - 3115 - 119 Street, T6J 5N5 Edmonton, Alberta, Canada

[21] Appl. No.: 593,565

[22] Filed: Oct. 5, 1990

Related U.S. Application Data

[63] Continuation of Ser. No. 303,968, Jan. 30, 1989, abandoned, which is a continuation of Ser. No. 942,460, Dec. 16, 1988, abandoned.

[51] Int. Cl.⁵ .................................................. A01C 1/06
[52] U.S. Cl. ................................................... 47/57.6
[58] Field of Search ............. 106/205; 71/6, 7, 64.02, 71/64.07, 64.09; 47/57.6; 435/178-181, 252.2, 260, 878

[56] References Cited

U.S. PATENT DOCUMENTS

| | | | |
|---|---|---|---|
| 2,168,332 | 8/1939 | Fischer | 47/DIG. 9 X |
| 2,200,532 | 5/1940 | Bond | 47/DIG. 9 |
| 2,967,376 | 1/1961 | Scott, Jr. | 47/57.6 |
| 3,054,219 | 9/1962 | Porter et al. | 435/878 X |
| 3,168,796 | 2/1965 | Scott et al. | 435/260 X |
| 3,499,748 | 3/1970 | Fraser | 47/57.6 X |
| 3,915,800 | 10/1975 | Kang et al. | 435/101 |
| 4,136,486 | 1/1979 | Franklin, Jr. et al. | 47/57.6 X |
| 4,250,660 | 2/1981 | Kitamura et al. | 47/57.6 |
| 4,344,857 | 8/1982 | Shasha et al. | 424/22 X |
| 4,367,609 | 1/1983 | Lloyd | 47/57.6 |
| 4,383,391 | 5/1983 | Thomas et al. | 47/57.6 |
| 4,434,231 | 2/1984 | Jung | 47/57.6 |
| 4,438,593 | 3/1984 | McNew et al. | 47/57.6 |
| 4,562,663 | 1/1986 | Redenbaugh | 47/58 |
| 4,563,360 | 1/1986 | Soucie et al. | 426/104 |
| 4,715,143 | 12/1987 | Redenbaugh et al. | 47/57.6 |

OTHER PUBLICATIONS

Carbohydrate Research (26), 1973 pp. 409–419.

Primary Examiner—Robert A. Hafer
Assistant Examiner—Kevin G. Rooney
Attorney, Agent, or Firm—Seed and Berry

[57] ABSTRACT

A composition for application to seed is disclosed, the composition including bacteria and adherent. The adherent is a biopolymer secreted naturally from bacteria and also acts as matrix for protecting bacteria applied to the seed. The invention is concerned particularly with a method and composition for adhering nitrogen-fixing bacteria to legume seed using a biopolymer secreted by the bacteria to be adhered.

13 Claims, No Drawings

METHOD OF ADHERING BACTERIA TO SEED AND COMPOSITION THEREFOR

CROSS-REFERENCE TO RELATED APPLICATION

This application is a continuation of U.S. application Ser. No. 07/303,968 filed Jan. 30, 1989, now abandoned, which application is a continuation of U.S. Ser. No. 06/942,460, filed Dec. 16, 1988, now abandoned.

FIELD OF THE INVENTION

This invention relates to a method of adhering bacteria to seed and to compositions useful therein.

BACKGROUND OF THE INVENTION

Soil bacteria are known to play an important role in plant growth. For example, some bacteria, especially certain Pseudomonas sp., are able to promote plant growth while other bacteria can promote emergence of plant seedlings. Because the bacteria reside in the soil, their effect on the plant is mediated through colonization in the area of the plant roots, termed the rhizosphere, where agents released by the plant are believed to accumulate to the extent that bacteria are attracted chemotacticly.

Perhaps the most well recognized plant/bacteria relationship is that which results in nitrogen fixation where nitrogen-fixing bacteria infect root hairs of leguminous plants, such as soybean, clover, alfalfa, string beans and peas. The infection leads to nodule formation within which free nitrogen is converted to combined nitrogen (nitrogen-fixation). In this way, legumes are at a selective advantage in unfertilized bare soil but this advantage is dependent upon the presence of appropriate bacteria during plant growth.

Given the beneficial effect which some soil bacteria have on plants, an art has developed which focuses on providing means for introducing selected bacteria to the growth environment of sown seeds or roots of maturing plants.

A variety of such techniques have been proposed in this art. For example, soil within which plants are grown can be directly inoculated with the bacteria. More typically, however, a carrier such as peat moss is impregnated with bacteria which allows the bacteria to survive until the impregnated carrier is placed in the soil. When seed planted with the impregnated carrier germinates and the plant begins to grow, the bacteria present in the inoculated carrier become available for interaction with plants roots e.g. by infecting the root hairs of a legume to establish a symbiotic, nitrogen fixing relationship.

A more promising method proposed in the art, with which the present invention is primarily concerned is that of adhering the bacteria to seed prior to planting. Obviously, where the seed is not to be planted immediately, the bacteria must be capable of surviving on the seed in order to be viable when the seed is planted. Typically, this is accomplished by drying the bacteria on the seed or by adhering a food source to the seed together with the bacteria.

U.S. Pat. No. 4,161,397 to Kalo Laboratories Inc. describes a liquid composition for application to seed in which microdried bacteria are suspended in a liquid carrier i.e. a mineral oil-gel matrix, having a fungicidal agent.

U.S. Pat. No. 4,136,486 describes a seed coating composition in which the bacteria are mixed with water and an adhesive agent such as an alkali metal salt of carboxymethyl cellulose. The composition may be freeze dried for shipping and reconstituted by the end user upon addition of water for application to seeds.

In another prior art proposal, U.S. Pat. No. 4,434,231 discloses a seed-coating composition comprising a polymeric matrix in which bacteria are embedded. The matrix comprises a polymer gel of cross-linked polysaccharide, sources of which include the fermentation products of microorganisms such as Xanthomonas or Arthrobacter or the fungi of the genus Sclerotium. Natural or biosynthetic gums derived from seaweed, plant exudates and seeds may also be used. The polysaccharides are treated prior to formation of the bacterial composition to establish the desired cross-linking such as by heat treatment, treatment by a metal salt or synergism by means of another polysaccharide so as to form a gel for subsequent application to seed once the bacteria are introduced into the gel.

SUMMARY OF THE INVENTION

It is an object of the present invention to provide a novel process for adhering bacteria to seed.

It is a further object of the present invention to provide a novel composition for application to seed.

It is an object of the present invention to provide seed to which bacteria are adhered using a novel composition.

In the present invention, biopolymeric substances secreted naturally by a variety of bacteria are utilized as adherent in a composition comprising bacteria which are to be coated on a selected seed variety.

Those biopolymeric substances which are secreted by bacteria during their normal course of growth, such as on conventional growth medium, and which are useful in adhering bacteria to a seed surface without further modification such as by chemical or temperature treatment are suitable for use in the present invention. It will be found that these biopolymeric substances require, on occasion, only to be dried after being applied as a bacteria-containing composition to the seed in order to attain the desired adherence of bacteria to seed. Further modification to generate cross-linking within the biopolymeric matrix is unnecessary.

The biopolymeric substances may be obtained by growing the bacteria which secrete the substances in a conventional manner. As will be apparent to those skilled in the microbiology art, the specific growth conditions and growth medium will vary according to the growth characteristics of the selected polymer-secreting bacterium. Thermophilic bacteria will clearly require warm temperatures during growth, while mesophiles and psychrophiles will benefit by growth at ambient and cool temperatures, respectively. The microbial growth art has progressed in many areas to the extent that media and growth conditions suitable for each bacterial genus have been developed. Production of the biopolymer by the appropriate bacterium requries no modification from accepted procedures.

The biopolymeric substances useful herein may be recovered for subsequent use in a variety of ways, depending on the growth medium employed. For example, recovery of biopolymer from liquid medium can be accomplished by filtration or centrifugation together with precipitation of the biopolymer if necessary. Alternatively, the recovery process is simplified by bacterial growth on solid medium which allows the secreted biopolymer to be collected simply by scraping it from the plate.

Once recovered, the biopolmer may be mixed with a population of the bacteria to be applied to the seed, to form a paste i.e. inoculant composition, for subsequent application. In order for the inoculated seed to have coated thereon a sufficient number of viable bacteria at the time of planting, the composition with which the seed is coated should comprise a bacterial population which is one or two orders of magnitude larger than the desired bacterial population on the seed, to account for bacterial mortality during processing and seed storage. In general, a seed should bear a bacterial population of from $10^2$ to $10^7$ cells of selected bacterium, so that the bacteria are able to affect the root region as desired. Correspondingly, the inoculant composition applied to the seed comprises a bacterial population of from $10^4$ to $10^9$ cells, or higher since it can be expected that about $10^2$ bacterial cells will not survive the treatment and storage process. It will be appreciated that these statistics are provided for guidance only, and need not be strictly adhered to provided that an ample bacterial population is presented to the root region of a plant which arises from the inoculated seed.

Once the inoculant composition is prepared, it may be applied to selected seed in a variety of ways. Preferably, the seed is first dried and sterilized before being coated with the inoculant composition. Thereafter, seed coating can be conducted using methods standard in this art such as by spraying or by stirring seeds in the inoculant.

Once inoculated, the coated seeds are preferably dried such as by air-drying at ambient temperatures using known techniques. Spray-drying, freeze-drying or heating may also be employed but caution should be exercised, particularly during heating, to avoid bacterial mortality.

Alternatively, the biopolymeric substance may be dried and stored, using the drying conditions described above e.g. air-drying or heating, for reconstitution at a later date. Reconstitution is suitably conducted using water, especially distilled and buffered water, in an amount sufficient to generate the paste-like consistency of the biopolymer. Reconstituted biopolymer may then be admixed with bacteria and applied to seed as described above. As a further alternative, the inoculant composition i.e. biopolymer and bacteria, may be dried as described for reconstitution and seed application at a later date. Since, in this case, the bacteria are subjected to two drying cycles, it is suggested that the bacterial population in the inoculant be increased, either by incorporating a greater population in the inoculant prior to drying or after reconstitution to account for deduction in viability of the total bacterial population.

Seeds inoculated as described above may then be planted in the usual manner.

DETAILED DESCRIPTION OF THE PREFERRED EMBODIMENTS

The biopolymeric substances particularly suited for use in the present invention are secreted from bacteria indigenous to soil, especially those bacteria which occupy the plant rhizosphere, i.e. rhizobacteria. Particularly preferred biopolymer sources are the bacteria of the family Rhizobiacea e.g. the genera Rhizobium and Bradyrhizobium, which are capable of entering into a symbiotic, nitrogen-fixing relationship with leguminous plants.

These bacteria are preferred owing to their ability to secrete biopolymers which exhibit properties desirable in adhering bacteria to seed. It has been observed that acidic heteroexopolysaccharides (acidic heteroEPS) are quite useful as an adherent in the inoculant composition. Acidic heteroexopolysaccharides are polysaccharides containing many different sugars or derivatives, such as uronic acid, which are secreted from i.e. not attached to, the bacteria which secrete them. The secretion of these particular biopolymers from various species and strains of Rhizobium is described by Bauer in Ann. Rev. Plant Physoil (1981) 32:407:49.

The chemical structure of an acidic heteroEPS varies according to the bacterium from which it is secreted. For example, the acidic heteroEPS from *R. trifolii* and *R. leguminosarum* are nearly identical whereas that from *R. meliloti* is different and that from *R. japonicum* is also different. A review of the known chemical structures appears in the Bauer reference cited above. It is to be noted that these specific acidic heteroEPS-producing bacteria are mentioned herein simply for exemplification. Other bacteria particularly other strains and species of Rhizobiacea, are capable of secreting these biopolymers and may serve as sources for the biopolymer to be used as adherent.

Where the biopolymer-secreting bacterium is a species of Rhizobium, the bacterium is cultured in accordance with recognized procedures which are specific for Rhizobia. For example, SAMA medium is preferred for growth of *R. trifolii*. The constitution of this medium can be altered, by supplanting carbon sources, altering concentration or type of salt etc. to accomodate growth of different Rhizobium strains, if necessary. As mentioned previously, growth can be conducted on a solid medium e.g. agar based, in which case the secreted substance may simply be collected by scraping, or in fermentation broth. Recovery of the acidic heteroEPS from broth is slightly more complicated but can be achieved using standard centrifugation techniques and can be enhanced by biopolymer precipitation with an alcohol such as ethanol prior to recovery. Extraction from solid media is preferred.

When recovering the biopolymer, there is no need to purify the polymer in order to remove other materials which may be secreted together with the biopolymer, provided that toxins are not present which are deleterious to the bacteria to be applied to the seed.

Microorganisms suitable for application to seed are preferably the Pseudomonads which promote plant growth, the nitrogen fixing bacteria which are suitably applied to legumes (including the Rhizobium sp. such as japonicum, phaseoli, meliloti, lupini, leguminosarum, fredii and other Rhizobium spp. of the cowpea miscellany e.g. the application of *R. trifolii* to which clover seed, application of *Bradyrhizobium japonicum* to soybean seed, application of *R. meliloti* to alfalfa seed etc.), and the Azotobacter and Azosperllium species which may be applied to the seed of grasses to assist in plant growth. Using the biopolymer described herein, any bacterium or microorganism may, in fact, be adhered to a seed with which it associates in a beneficial manner.

Because Rhizobia are able both to secrete the desired biopolymer and to interact beneficially with leguminous plants, a particularly preferred embodiment of the present invention comprises culturing Rhizobium sp. to cause secretion of the biopolymer within the vicinity of the bacteria, recovering the biopolymer in the presence of the bacteria and applying the recovered composition to legume seed. In this embodiment, bacterial growth and biopolymer production are combined, and a suitable inoculant composition can be generated simply by scraping the surface of the solid medium to gather biopolymer and bacteria. The composition can then be applied to the seed and dried, as described herein.

Selection of the appropriate bacteria for subsequent seed application can be made on the basis of the established infection patterns. Not all nitrogen-fixing bacteria are able to infect all legume root hairs, the relationship being a rather specific one as observed to date. In addition, only about 90 percent of all legume species are capable of being nodulated. Thus the bacteria selected and the seed to be coated should both be members of what is termed a "cross-inoculation group" i.e. a group of Rhizobium strains able to infect a group of related legumes.

Investigations have shown that the dried bacteria coated on the seed are protected within the composition and are held favourably to the seed coat by the secreted biopolymer during storage and handling. Upon exposure to a growth environment e.g. upon planting of the seed, the bacteria are revived and are sufficiently near to the growing root of the young plant to allow infection and eventual nodulation leading ultimately to a symbiotic, nitrogen-fixing environment.

It will be appreciated that the composition described herein can be modified to incorporate a variety of additional components including other bacteria which cooperate to enhance infection by the polymer-secreting bacteria. Other chemical agents may be added, such as fungicides, to resist attack during growth of the seed. Fillers may also be employed in the composition if desired to alter the consistency of the composition.

Embodiments of the invention are described hereinafter by way of example only.

EXAMPLE 1

The Production of Bacteria and Exopolymer

The organism, *Rhizobium trifolii*, strain 0403 (available from the culture collection at the Rothamsted Experimental Station, Harpenden, Hertforshire, U.K.) was grown on agar plates containing the medium SAMA until visible exopolymer formed on the surface of the agar. The medium composition is given in Table 1.

TABLE 1

| Nutrients | Grams per liter |
|---|---|
| sucrose | 10.0 |
| Difco yeast extract | 1.0 |
| $MgSO_4 \cdot 7H_2O$ | 0.2 |
| NaCl | 0.2 |
| $K_2HPO_4$ | 0.5 |
| Difco agar | 15.0 | plus iron solution 1.0 ml per liter of complete SAMA medium.

composition of iron solution: $FeCl_3 \cdot 6H_2O$—0.67 grams concentrated HCL—0.42 ml $H_2O$—100 ml

Example 2

The survival of Bacteria in Dried Exopolymer

To determine if the bacteria could survive in appreciable numbers in dried exopolymer, the following experiment was performed.

*Rhizobium trifolii* 0403 was inoculated onto SAMA medium agar plates and incubated at room temperature for four (4) days. The mixture of bacterial exopolymer and bacteria produced on the surface of the plates was scraped off into a sterile beaker. Weighed amounts of this mixture were placed in plastic petri plates and air dried at room temperature. Plate counts on the original undried mixture were performed immediately and then over time on the dried material to determine the number of viable bacteria/gram dry weight exopolymer.

The results of this screening are as follows. On the basis of viable bacteria per gram dry weight of exopolymer, the original undried material contained $4.0 \times 10^8$ bacteria. Two days after the bacteria were dried in the exopolymer, $3.2 \times 10^6$ remained viable or 0.8% had survived. After 51 days of storage at 4° C., an average of $2.6 \times 10^6$ bacteria/gm dry exopolymer or 0.65% had survived.

Example 3

The Application of Bacteria to Seeds

Rhizobium sp. 0403 and associated biopolymer was grown and harvested as in Example 2 except the bacteria were six (6) days old when they were scraped from the plates. Dry clover seeds were coated with this mixture in a ratio of between 1.05 to 0.95 dry wt. seeds/wet weight biopolymer-bacteria mixture. This mixture was allowed to dry in air for 12-24 h. at room temperature.

The resulting product was a hard dry mixture of seeds coated with the mixture of biopolymer and bacteria.

Example 4

The Survival of Bacteria on Seeds

Seeds coated with a mixture of bacteria and biopolymer as described in Example 3 were stored at 4° C. in air. Periodically, coated seed samples were taken, weighed, resuspended in phosphate buffered saline (pH 6.7), shaken well, and allowed to stand for 10 minutes. Plate counts of the suspensions were performed after appropriate dilutions and the number of viable bacteria/gm dry weight seed determined.

The results of this experiment are shown in Table 2. the bacteria, after the initial drying, were found to retain a significant level of viability over long periods of time.

TABLE 2

| | Survival of Bacteria | | |
|---|---|---|---|
| | | Viable cells · $10^8$/gm | |
| Date | Age-days | seed | % survival |
| 9/9/85 | 0-before drying | 200 | 100 |
| 9/11/85 | 2 | 50 | 25 |
| 9/18/85 | 9 | 30 | 15 |
| 9/26/85 | 17 | 32 | 16 |
| 10/3/85 | 24 | 14 | 7 |
| 10/10/85 | 31 | 10 | 5 |
| 10/17/85 | 38 | 10 | 5 |
| 11/1/85 | 53 | 14 | 7 |
| 11/22/85 | 74 | 5.0 | 3 |
| 12/11/86 | 93 | 4.1 | 2 |
| 1/2/86 | 115 | 6.0 | 3 |
| 2/12/86 | 156 | 1.7 | 1 |

Example 5

The Assistance of Bacteria Adhering to the Plant in Fixing Atmospheric nitrogen

Seed coated with the bacteria-exopolymer mixture were placed on a paper wick in a plastic growth pouch containing plant nutrient solution without fixed nitrogen added to the solution. The plants are therefore dependent for growth upon the fixation of atmospheric nitrogen by the Rhizobium bacteria. The plants were grown in an illuminated, temperature controlled growth room. Nodules formed by the adhered Rhizobium bacteria appeared within fourteen days. Evidence of nitrogen fixation by the adhered Rhizobium bacteria was apparent by the green growth of these plants compared to the yellow stunted growth of plants that were germinated from seed that had not been coated with the bacteria-exopolymer mixture.

It is to be appreciated that while the biopolymer described herein is produced by bacteria to be adhered to seed, it is not absolutely essential that these particular biopolymer-secreting bacteria represent a component of the coated seed. The biopolymer may be isolated from the culture and used as a matrix to adhere different bacteria to the seed. Thus, the present invention is not necessarily restricted to the concept of adhering nitrogen-fixing bacteria to legumes. The biopolymer may be used to fix any bacteria to seed, provided the selected bacteria are able to survive briefly i.e. during mixing with biopolymer and upon germination, within the biopolymer.

For economy and simplicity, however, biopolymer of nitrogen fixing bacteria is preferably used to adhere to legume seed those bacteria which produce the biopolymer with which the bacteria are adhered.

What is claimed is:

1. A method of coating seed with bacteria which comprises applying to seed an inoculant composition comprising a population of bacteria and a concentrated biopolymer naturally secreted by a bacterium, said concentrated biopolymer prepared by providing a medium suitable to support the growth of the bacterium, growing the bacterium, and recovering the biopolymer from the medium, said concentrated biopolymer being substantially unmodified and forming a seed coat in which the population of bacteria is able to survive at least until the germination of the seed; and drying said coated seed.

2. The method according to claim 1 wherein said biopolymer is an acidic heteroexopolysaccharide.

3. The method according to claim 2 wherein said acidic heteroexopolysaccharide is obtained from a rhizobacterium.

4. The method according to claim 3 wherein the composition comprises a population of rhizobacteria.

5. The method according to claim 1 wherein said inoculant composition comprises a population of rhizobacteria and said biopolymer is an acidic heteroexopolysaccharide secreted by Rhizobium sp.

6. The method according to claim 5 wherein said Rhizobium sp. is selected from the group consisting of japonicum, trifolii, phaseoli, meliloti, lupini, fredii and leguminosarum.

7. The method according to claim 5 wherein said Rhizobium sp. is R. trifolii.

8. The method according to claim 1 wherein the biopolymer is precipitated from the medium prior to recovery.

9. The method according to claim 8 wherein the biopolymer is precipitated from the medium with alcohol.

10. A method of coating seed with bacteria which comprises applying to seed an inoculant composition comprising a population of bacteria and a concentrated substantially unmodified biopolymer secreted thereby, said concentrated biopolymer prepared by providing a medium suitable to support the growth of the bacterium, growing the bacterium, and recovering the biopolymer from the medium, to form a seed coat in which the population of bacteria is able to survive at least until germination of the seed; and drying said coated seed.

11. The method according to claim 10 wherein said biopolymer is an acidic heteroexopolysaccharide.

12. The method according to claim 11 wherein said bacteria is a rhizobacteria.

13. The method according to claim 12 wherein said bacteria is a Rhizobium.

* * * * *